US007817319B2

(12) United States Patent
Pinard et al.

(10) Patent No.: US 7,817,319 B2
(45) Date of Patent: Oct. 19, 2010

(54) SYSTEM AND METHOD FOR EMPLOYING A RESONANT SCANNER IN AN X-Y HIGH SPEED DRILLING SYSTEM TO PROVIDE LOW NET SCANNING VELOCITY DURING DRILLING

(75) Inventors: Adam I. Pinard, Carlisle, MA (US); Kurt Pelsue, Wayland, MA (US); Felix Stukalin, Southborough, MA (US)

(73) Assignee: GSI Group Corporation, Bedford, MA (US)

(*) Notice: Subject to any disclaimer, the term of this patent is extended or adjusted under 35 U.S.C. 154(b) by 0 days.

(21) Appl. No.: 11/828,391

(22) Filed: Jul. 26, 2007

(65) Prior Publication Data
US 2008/0049285 A1 Feb. 28, 2008

Related U.S. Application Data

(60) Provisional application No. 60/839,211, filed on Aug. 22, 2006.

(51) Int. Cl.
*G02B 26/08* (2006.01)
(52) U.S. Cl. .................................. 359/202.1
(58) Field of Classification Search ......... 359/201–202, 359/199, 213–214, 223–224, 298, 305, 315–324, 359/900; 219/121.6, 121.7, 121.71, 121.8
See application file for complete search history.

(56) References Cited
U.S. PATENT DOCUMENTS
5,430,509 A    7/1995 Kobayashi
(Continued)

FOREIGN PATENT DOCUMENTS
EP    0626605 A    11/1994
(Continued)

OTHER PUBLICATIONS
"CRS Series: Resonant Optical Scanners", GSI Group, Inc., Sep. 2005, pp. 1-4.
(Continued)

*Primary Examiner*—Stephone B Allen
*Assistant Examiner*—Jennifer L. Doak
(74) *Attorney, Agent, or Firm*—Gauthier & Connors LLP

(57) ABSTRACT

A laser processing system is disclosed for providing a relatively small velocity of a laser beam at target location while at least one scanner scans at a relatively larger velocity. The system includes a laser source, a first scanning unit, a beam expander, a second scanning unit and focusing optics. The laser source is for providing a pulsed laser output having at least one beam with a beam dimension. The first scanning unit is for scanning the laser output in a first direction along a first axis at the target location. The beam expander is for receiving the laser output and for modifying a beam diameter of the laser output and providing a modified laser output. The second scanning unit is for scanning the modified laser output from the beam expander in a second direction along the first axis at the target location. The second direction is substantially opposite to the first direction along the first axis such that a net velocity of the modified laser output along the first axis at the target location may be made to be effectively zero during a laser pulse. The focusing optics is for focusing the modified laser output toward the target location.

27 Claims, 6 Drawing Sheets

U.S. PATENT DOCUMENTS

| | | | |
|---|---|---|---|
| 5,452,275 | A | 9/1995 | Ogawa |
| 5,653,900 | A | 8/1997 | Clement et al. |
| 5,751,585 | A | 5/1998 | Cutler et al. |
| 5,798,927 | A | 8/1998 | Cutler et al. |
| 5,837,962 | A | 11/1998 | Overbeck |
| 5,847,960 | A | 12/1998 | Cutler et al. |
| 6,107,600 | A | 8/2000 | Kurosawa |
| 6,177,648 | B1 | 1/2001 | Lawson et al. |
| 6,424,632 | B1 | 7/2002 | Poret et al. |
| 6,433,907 | B1 * | 8/2002 | Lippert et al. ............... 359/201 |
| 6,479,788 | B1 | 11/2002 | Arai et al. |
| 6,496,292 | B2 | 12/2002 | Fillion et al. |
| 6,538,230 | B2 | 3/2003 | Lawson |
| 6,706,998 | B2 | 3/2004 | Cutler |
| 6,706,999 | B1 | 3/2004 | Barrett et al. |
| 6,875,951 | B2 | 4/2005 | Sakamoto et al. |
| 6,951,995 | B2 | 10/2005 | Couch et al. |
| 7,050,208 | B2 | 5/2006 | Overbeck |
| 2002/0167581 | A1 | 11/2002 | Cordingley et al. |
| 2003/0102427 | A1 | 6/2003 | Tohyama et al. |
| 2004/0104208 | A1 | 6/2004 | Ijima et al. |
| 2004/0201897 | A1 | 10/2004 | Lizotte |
| 2004/0251243 | A1 | 12/2004 | Lizotte et al. |
| 2005/0128553 | A1 | 6/2005 | Toyama et al. |
| 2005/0184156 | A1 | 8/2005 | Otsuki et al. |
| 2005/0187650 | A1 | 8/2005 | Toyama et al. |

FOREIGN PATENT DOCUMENTS

| | | |
|---|---|---|
| JP | 2001062577 A | 3/2001 |
| JP | 2002-346775 | 12/2002 |
| JP | 2003-088986 | 3/2003 |
| JP | 2003136270 | 5/2003 |
| WO | WO2004016847 A | 2/2004 |

OTHER PUBLICATIONS

"VM Series: Moving Magnet Optical Scanners", GSI Group, Inc., Sep. 2005, pp. 1-4.

"S-330: High Speed Piezo Tip/Tilt Platforms", PI, 2005, pp. 3-22 to 3-23.

"Diamond Ki-Series Specifications", Coherent Laser Group, 2000, pp. 1-2.

Model AGD-406B1: Infrared Acousto-Optic Deflector, IntraActtion Corp., Bellwood, IL, Jul. 2006, 1 page.

LS600-1011: High Power AO Deflector, Isomet Corporation, Springfield, VA, Jul. 2006, pp. 1-2.

* cited by examiner

SYSTEM AND METHOD FOR EMPLOYING A RESONANT SCANNER IN AN X-Y HIGH SPEED DRILLING SYSTEM TO PROVIDE LOW NET SCANNING VELOCITY DURING DRILLING

PRIORITY

The present application claims priority to U.S. Provisional Patent Application Ser. No. 60/839,211 filed Aug. 22, 2006.

BACKGROUND

The present invention generally relates to laser processing systems for providing the drilling of holes in printed circuit boards, and relates in particular to such laser processing systems that provide improved speed and accuracy in the processing of printed circuit boards. The holes may used to provide paths (or vias) through the circuit boards.

It is known that laser drilling of holes is often done using a laser beam positioned with an optical scanner, such as for example, a galvanometric optical scanner. A galvanometric optical scanner generally includes a scan mirror coupled to a limited rotation motor. Such scanners are commonly referred to as "galvos" or "galvo scanners", and examples of such scanners are disclosed in U.S. Pat. No. 6,424,632 assigned to the assignee of the present invention.

To drill a round hole, it is important that the laser spot be relatively stationary with respect to the desired hole location for the duration of the laser pulse. For each hole, the limited rotation motors are rotated to position the mirror at the correct coordinates, and the laser is fired once the limited rotation motors are settled. Generally, the laser pulse is much shorter in duration than the time needed for repositioning the mirrors on the limited rotation motors. For these reasons, the speed of drilling multiple holes is limited by the response rate of the positioning systems, not by laser power. The settling performance of the limited rotation motors is generally limited by the resonant frequency, and the stepping rate (to step and settle) is limited by the efficiency of the motors. Increasing the bandwidth of the motors is, however, constrained by the fact that the power dissipated in limited rotation motors (e.g., in the form of heat) is proportional to the speed to the fifth power.

There remains a need, therefore, for a more efficient and economical laser processing system that improves the efficiency of the positioning system.

SUMMARY

The invention provides a laser processing system for providing a relatively small velocity of a laser beam at target location while at least one scanner scans at a relatively larger velocity. In accordance with an embodiment, the system includes a laser source, a first scanning unit, a beam expander, a second scanning unit and focusing optics. The laser source is for providing a pulsed laser output having at least one beam with a beam dimension. The first scanning unit is for scanning the laser output in a first direction along a first axis at the target location. The beam expander is for receiving the laser output and for modifying a beam diameter of the laser output and providing a modified laser output. The second scanning unit is for scanning the modified laser output from the beam expander in a second direction along the first axis at the target location. The second direction is substantially opposite to the first direction along the first axis such that a net velocity of the modified laser output along the first axis at the target location may be made to be effectively zero during a laser pulse. The focusing optics is for focusing the modified laser output toward the target location.

BRIEF DESCRIPTION OF THE ILLUSTRATED EMBODIMENTS

The following description may be further understood with reference to the accompanying drawings in which.

The drawings are shown for illustrative purposes only.

DETAILED DESCRIPTION

In many applications, the areas on a target substrate that are to be drilled as holes are arranged such that there will exist clusters of closely spaced holes along a row with a spacing that is much smaller than the field size. In these cases, it is possible to use the limited rotation motors in constant velocity mode in combination with a higher speed scanner to yield faster drilling speeds. The scanner may be an acousto-optic deflector, an electro-optic deflector, a spinning polygon, an additional galvanometric optical scanner, or a resonant scanner.

The additional scanner needs high speed but much less angular travel, so placement before a beam expander where a small aperture is needed may be optimal in certain applications. In general, the time in which a mirror may be moved scales with aperture size. By placing the high speed scanning element prior to the beam expander, a smaller aperture, higher speed system may be provided. Other advantages of such a system include lower power consumption, less manufacturing expense, relaxed accuracy requirements, easier calibration and easier packaging.

The invention therefore provides in accordance with an embodiment, that a fast scanner may be used in at least one direction (X axis or Y axis) in addition to another slower scanner in that same axis. The fast scanner may be, for example, a resonant scanner as discussed herein, or could be any type of oscillating or linear fast scanner.

Figure 1:
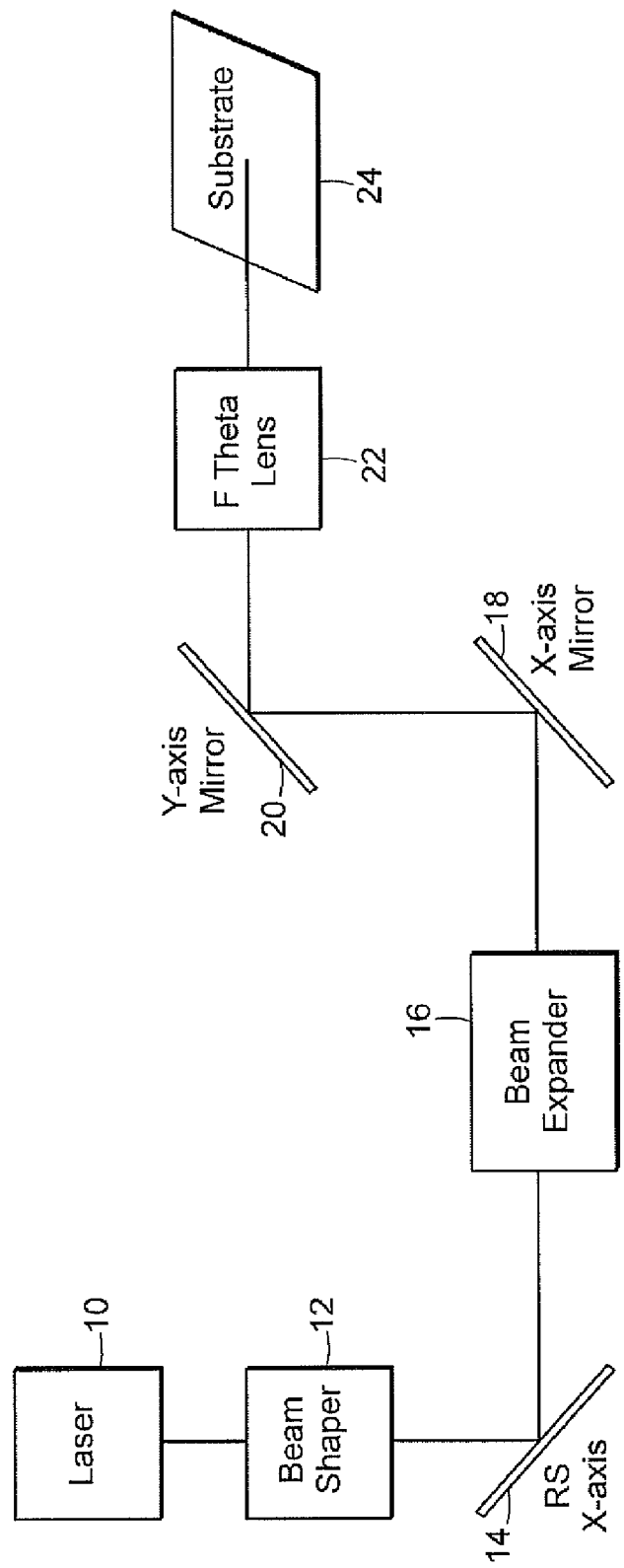
FIG. 1 shows an illustrative diagrammatic view of a laser processing system in accordance with an embodiment of the invention.

FIG. 1 shows a system in accordance with an embodiment of the invention that employs such a resonant scanner. The system of FIG. 1 includes a laser source 10, a beam shaper unit 12, a resonant scanning mirror 14 (fast scanner), a beam expander 16, an X-axis mirror 18, a Y-axis mirror 20, and an ƒtheta lens 22 for directing the beam toward a substrate 24. The resonant scanner 14 generates a sinusoidal position with fixed frequency but adjustable amplitude. The X-axis position is controlled by both the resonant scanner 14 and the mirror 18, which is coupled to a limited rotation motor (slow X-axis scanner). The Y-axis position is controlled by the mirror 20, which is coupled to another limited rotation mirror (slow Y-axis scanner).

The beam shaping unit 12 may include a beam converter that affects the size, geometric shape, or intensity distribution of the laser output. For example, the unit 12 may include a spherical or anomorphic beam expander that matches a circular or rectangular laser output beam to the aperture of the resonant scanner or other optical components to alter the intensity distribution. The beam shaping unit 12, for example, may provide for conversion of a Gaussian or other non-uniform beam to a nearly uniform (e.g., top hat) beam. Spatial filtering may also be employed in certain embodiments to improve beam quality of the laser output.

The resonant scanner 14 may be for example, a high frequency scanner that operates at under 4000 Hz to about 8000 Hz, and may include torsion components that are mechanically tuned to resonate in opposite phase such that they produce torques that cancel one another, thereby minimizing vibration.

In a substrate to be processed that includes a row of evenly spaced holes along the X-axis, it is possible to position the Y-axis limited rotation motor to the location of the row, move the X-axis limited rotation motor, and then modulate the position of the laser beam along the X-axis with the resonant scanner such that there exist periods of relatively little motion when the position of the laser is at the location of the hole. This condition of near zero velocity holds in each direction of travel, allowing for flexibility in drilling patterns. The resonant frequency may correspond to the finest pitch, and the hole spacing may be an integer multiple of the pitch.

The beam expander 16 has an expansion ratio that alters the size of a laser beam of the laser output. A ratio greater than unity is to represent a beam of the laser output that at the output of the expander, has a dimension (e.g., a diameter or major axis length) that is larger than the dimension at the expander input. An expansion ratio of less than one results in a reduced beam dimensions. Generally, the beam expansion ratio will be chosen to provide a certain spot size at the surfaces. The spot size relates to the focal length and diameter of the beam at the output focusing optics, which may include an $f$-theta corrected lens for scanning.

Commercially available off the shelf beam expanders are generally designed for on-axis operation. The design of the beam expander 16 includes consideration of aberrations associated with the beam size and maximum angle of an incident laser beam. In some embodiments, the resonant scanner is only accessed when the beam is one of at, near, or on axis and wide field requirements of the beam expander are thereby reduced relative to prior systems. In at least one embodiment the angular field may be small enough to allow the use of off-the-shelf beam expanders. In any case, the use of one or more beam expanders in optical scanning systems using various scan mechanisms is known as disclosed, for example, in U.S. Pat. Nos. 4,251,125; 5,109,149 and 6,307,799.

Expansion by the expansion ratio however, scales the output angle inversely and in direct proportion. The high speed scanning element therefore must have a full scale amplitude at the highest speed that is sufficiently large to compensate for such angle reduction. Resonant scanners, such as a CRS series scanner as sold by GSI Group Corporation of Billerica, Mass., may have electrically adjustable amplitudes approaching 20 degrees and generally provide for a combination of wide angle scanning at high frequencies. Scan rate, scan angle and beam size calculations for each mirror may be employed knowing that mirror density ($\rho$), mirror radius (R), and mirror thickness (L). In particular, mirror mass (M), and mirror inertia (J) may be determined, and the energy required to reach a desired velocity for the mirror may also be determined.

Figure 2:
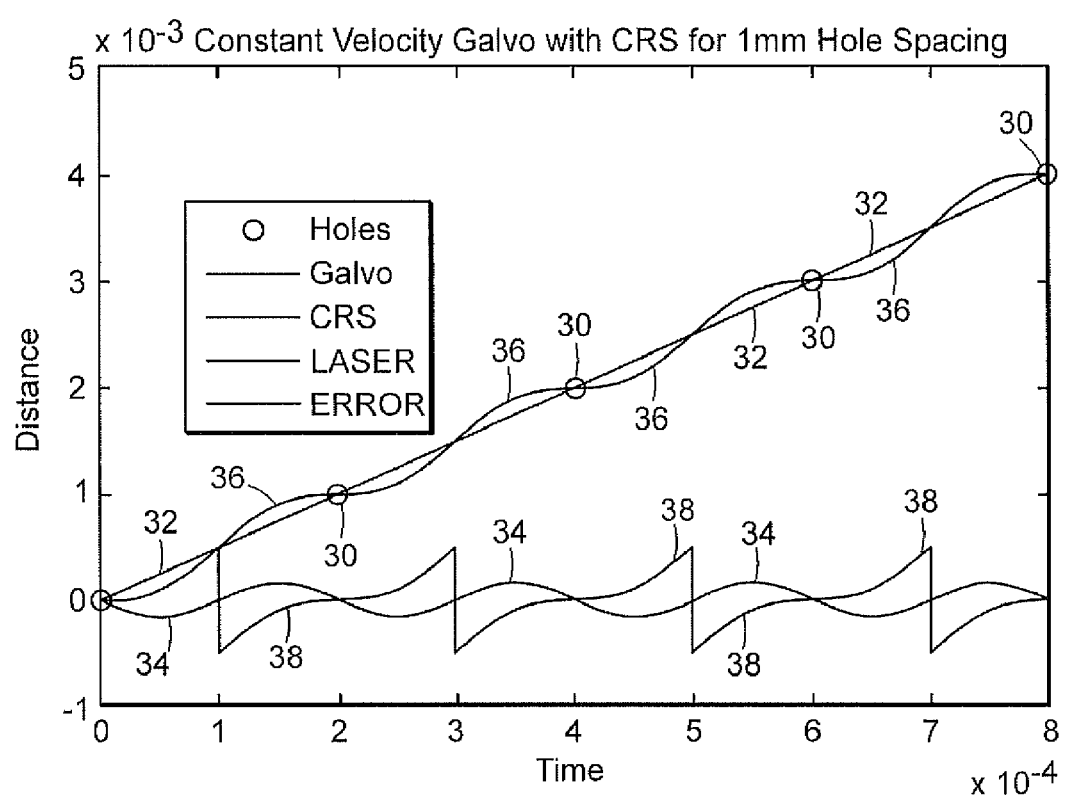
FIG. 2 shows an illustrative graphical representation of the time and position of different elements in a system in accordance with an embodiment of the invention

FIG. 2 shows a graphical illustration of distance versus time for a constant velocity limited rotation motor in combination with a resonant scanner, and illustrates how the laser position is relatively constant at the location of the hole as long as the laser duty cycle is less than about, for example 20%. In particular, the holes to be drilled are shown at 30, the movement of the X-axis limited rotation motor is shown at 32, and the movement of the resonant scanner is shown at 34. The laser position is shown at 36 and the error is shown at 38. The X-axis limited rotation motor and the resonant scanner are moving in opposite directions such that at the positions of the holes, they effectively stop the velocity of the laser beam for the time needed to drill the hole in substrate 24 shown in FIG. 1, with application of one or more laser pulses from a pulsed laser, or a gated CW laser, or other suitable laser outputs.

The sine wave scanning illustrated in the above example by the resonant scanner may be accomplished by other types of scanners such as an acousto-optic deflector (with appropriate correction for the cylindrical lens effect), or a limited rotation motor. In such other cases, the scanning may be triangular wave or a raster pattern with either constant or variable scan frequency and/or amplitude. The drilling may be done in either direction. For an acousto-optic deflector, an electro-optic deflector, or a limited rotation motor with a linear controller, the holes need not be periodic. These applications may also be sensitive to drift in the laser pointing, which is minimized by the beam expander (as a consequence of reduced divergence angle). In the case of a resonant scanner or limited rotation motor, calibration of the high speed axis may be done continually with the use of a split cell with a laser on the back of the mirror to compensate for positional drift of the high speed component.

Figure 3:
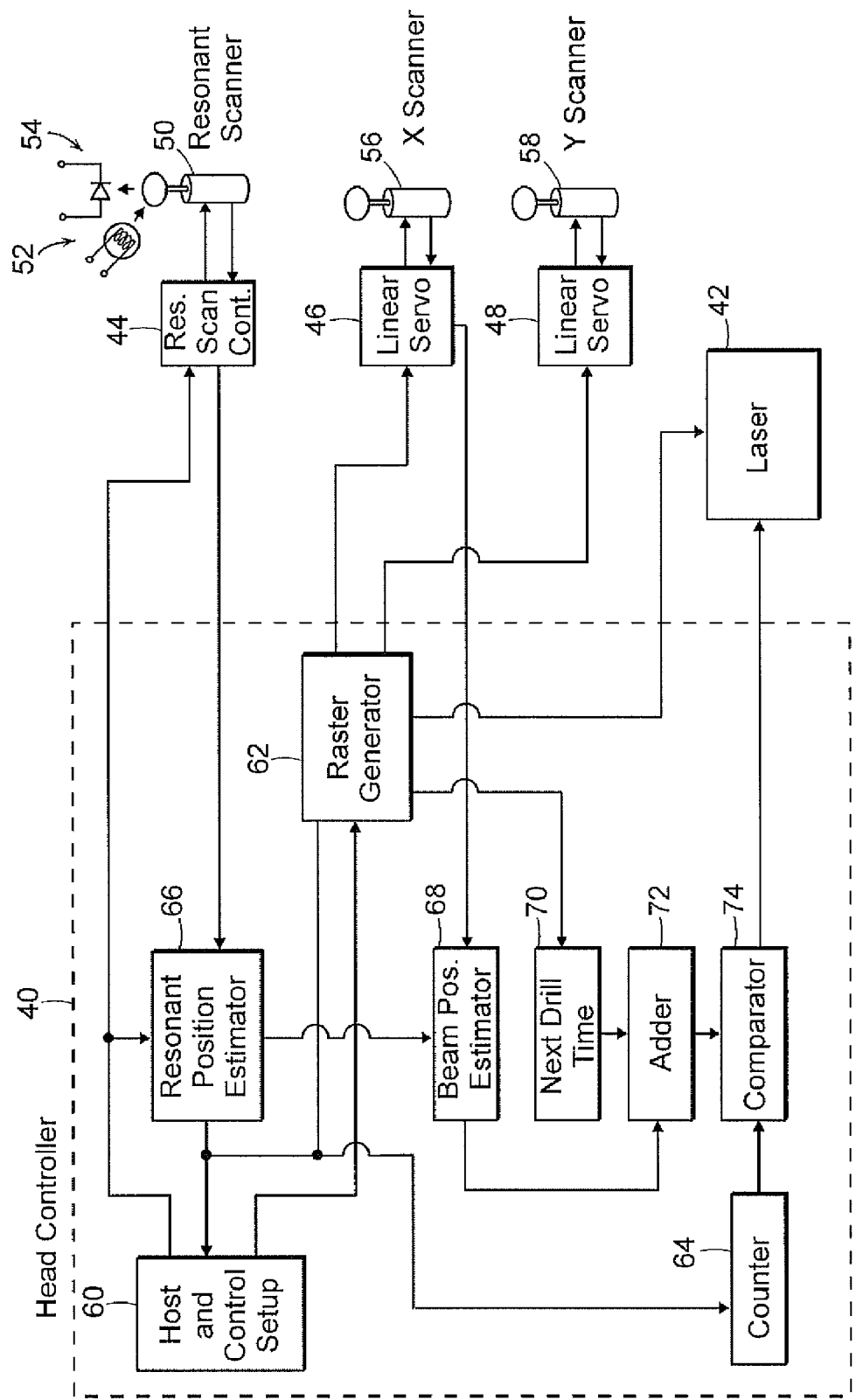
FIG. 3 shows an illustrative diagrammatic functional view of the elements of a system in accordance with an embodiment of the invention.

FIG. 3 shows a block diagram of a system in accordance with an embodiment of the invention. The system includes a head controller 40 that controls the laser 42, resonant scanner controller 44, the X-axis linear scanner controller 46 and the Y-axis linear scanner controller 48. The resonant scanner controller 44 drives a resonant scanner 50, which provides velocity a feedback signal to the controller 44, optionally using a photo source 52 and photo detector 54. When using such a detector, the emitter directs a beam of light to the scan mirror (or backside mirror) which then scans across the crossing detectors at different angles of scan. Each detector may be formed of a bi-cell detector with each cell containing closely spaced detector surfaces separated by a thin line. When the power on each side of the bi-cell is equal a precise measurement of crossing can be made. By sensing the sequence of bi-cell illumination the scanners direction can be determined and the time intervals between laser impingement on detector 1 and detector 2 along with the frequency information may be used to calculate the scan amplitude. This sensor system may be substituted for the velocity and zero crossing signals to the resonant position estimator. The X-axis linear controller 46 drives an X-axis scanner 56 from which the controller 44 receives a position feedback signal. The Y-axis linear controller 48 drives a Y-axis scanner 58 from which the controller 46 receives a position feedback signal.

Embodiments utilizing a resonant scanner as a first high speed scanner in combination with a linear galvanometer based second scanner provide for adjustment for drilling at non-integer or non-even spacing. For example, a circuit board may have target locations with varied center to center spacing, for example within different regions of the board, or at target locations where at least one of a row or column of vias are to be formed. The position and velocity of at least one of the mirrors 17, 18 of the second scanner are controlled to produce a scan based on a trajectory plan generated within the head controller 40 of FIG. 3. The controller 40 includes a raster generator 62 that provides the drive signals for the X,Y scanners 46, 48. The typical response time of a galvanometric scanner to a position or velocity command may be a few hundred microsecond, and comparable to the temporal spacing between consecutive pulses of a typical $CO_2$ laser utilized for PCB drilling, for example.

Further, the amplitude of resonant scanners may be dynamically adjusted, at least at low frequency. For example, the CRS scanner mentioned above includes a driver board that provides for phase adjustment and amplitude (scan angle) control with 0-5V input voltages, a 6 msec settling time. The adjustment provides yet another option for control of the scan velocity at the fixed resonant frequency. This option may be used alone or in combination with adjustment of the output mirrors, and with consideration of the beam size and corresponding spot size on the surface of the workpiece.

Under certain conditions the variable angular speed (zero rad/sec to maximum rad/sec) of the resonant scanner at a given amplitude also provides for some adjustment of scan speed. In laser processing applications where a single short pulse or group of short pulses is applied during a cycle of the resonant scanner, the pulse generation may be timed based on the pre-determined resonant scanner speed at some instant. The speed of the second scanner is then also adjusted using the controller of FIG. 3.

The head controller 40 includes a host and control setup unit 60 that calculates and sets up the scanner amplitude of the resonant scanner based on the desired velocity correction, the raster pattern and the hole locations, and the resonant time schedule. The unit 60 provides an amplitude signal to the controller 44, and provides job pattern and schedule information to a raster generator unit 62.

The resonant scanner oscillates at a pre-determined frequency in free running operation with sinusoidal amplitude variation. It is convenient to operate the system with the resonant scanner as the master, wherein timing derived from the scanner becomes the master clock for the scan system. The resonant scanner controller 44 provides position information and velocity information to a resonant position estimator 66, which provides estimated beam position information to a beam position estimator 68. The clock signal is based on a zero crossing of the scan velocity or may be based on a separate optical crossing detector. The clock signal sets the pace for the raster generator 62. The beam position estimator also provides an up-sampled clock signal to the host and control setup unit 60, counter 64, and the raster generator 62.

The raster generator drives the scanners to be passing a target at a predetermined time (next drill time) when the resonant scanner is at the correct velocity. The raster generator 62 provides this information to a next drill time unit 70, which in turn provides phase error information to an adder unit 72. The adder unit 72 also receives position phase error information from the beam position estimator 68. The phase error is added to the next drill time to set the exact time when the beam will be over the next hole location. The raster generator may also output laser settings as well as calibration functions for the error of the electro optical system via a comparator 74 that receives an output from the adder unit 72 and the counter 64.

In accordance with an embodiment, the pulse rate of the laser may be 5000 Hz, the pulse width may be $30 \times 10^{-6}$ sec., and the beam diameter before beam expansion shaping may be 10 mm. The substrate may require, for example, holes with a 1 mm spacing and error of 0.001 mm. The fast axis scanner amplitude (in radians) is set to be equal to the hole spacing (the distance between holes in meters)×the telescope magnification $(M)/(\pi \times f\text{theta})$ where $f\text{theta}$ is the focal length of the lens in meters. The velocity of the galvanometer (in radians/sec.) is set to be equal to the hole spacing×the frequency of the resonant scanner.

In particular, the resonant scanner 50, which in certain embodiments provides the clock for the system, self resonates based on its own mechanical design. When resonating a zero crossing, the clock may be used to measure the exact frequency of the scanner, which is reported to the host controller unit 60. The host control unit 60 then calculates the correct resonant amplitude to drive the resonant scanner 50 and provides the amplitude information to the resonant position estimator 66. The optical scan angle is provided in radians by hole separation distance divided by $\pi$ multiplied by the magnification divided by the focal length of the lens. In accordance with an embodiment, the optical scan angle may be 0.011 radians. The host controller unit uses the frequency derived from the zero crossing detector and the velocity from the resonant scan controller to compute the x raster velocity to be included in the job sent to the raster generator.

The angular optical scan velocity may be the minimum hole separation distance (finest pitch) divided by the focal length of the lens multiplied by the resonant frequency. The resonant position estimator 66 uses the velocity and zero crossing clock (frequency) to calculate the angular position of the resonant scanner, which is provided to the beam position estimator 68. The beam position estimator 68 uses that information with the position of the x scanner to calculate the position error phase error (time difference from schedule). The position error phase error is provided to the adder, which offsets the count at which the laser will fire by an amount to correct the spot position in the field. It also produces an up sampled high resolution time clock signal based on the resonant scanners beat. The up sampled clock that has many time clocks per resonant cycle to improve accuracy.

The estimated position is provided by the optical scan angle x sin ($2\pi$ multiplied by the up-sampled clock). The host provides a job to the raster generator including the hole spacing and locations with real times that the scanner should pass over holes to be processed. These real times are based on the resonant scanner frequency at high resolution from the up sampled clock of the resonant position estimator. It also provides laser control parameters like pulse energy based on the job set up files.

The raster generator transmits the next real time drill time to the next drill time register to schedule the next laser pulse. The raster generator creates this raster pattern and executes to the schedule based on the resonant scanner frequency. The up sampled clock also goes to the counter which keeps real resonant time. The connected comparator looks at the true phase corrected position in the adder to signal the laser when a hole is in alignment.

Figure 4:
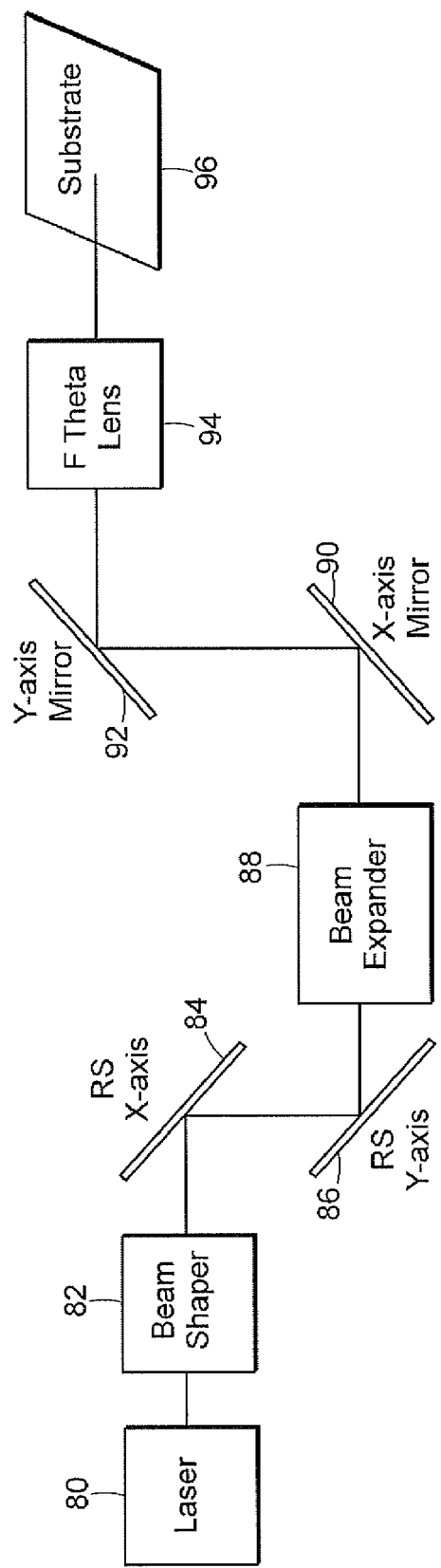
FIG. 4 shows an illustrative diagrammatic view of a laser processing system in accordance with a further embodiment of the invention.

FIG. 4 shows a system in accordance with a further embodiment of the invention that includes two fast axis scanners, for instance X and Y galvanometric scanners. In particular, the system includes a laser 80, a beam shaper 82, an X-axis resonant scanner mirror 84, a Y-axis resonant scanner mirror 86, a beam expander 88, a linear limited rotation motor controlled X-axis mirror 90, a linear limited rotation motor controlled Y-axis mirror 92, and an $f\text{theta}$ lens unit 94 for directing the laser beam toward a substrate to be processed 96. In this system, the movement of the X-axis linear controlled mirror 90 and the Y-axis linear controlled mirror 92 are adjusted to coact with the movement of the fast X-axis and Y-axis mirrors 84, 86 to cause the velocity to be effectively zero during drilling of the holes. Such a system typically permits not only rapid drilling of closely spaces holes in a single direction, but over a relatively small two dimensional area. Alternately, if the X and Y scanners 84 and 86 are synchronized carefully, the system may also operate on a diagonal (i.e., a direction having non-zero X and non-zero Y components.

In an application to laser drilling of PCBs using a $CO_2$ laser, the resonant scanner may be provided with a 5 KHz frequency, which is close to the repetition frequency of many $CO_2$ lasers. Therefore, with continuous motion of the second scanner, holes may be drilled without sacrificing throughput.

In some embodiments a beam expander may be replaced with an optical relay or other imaging system. In certain cases the pupil of the second linear scanner may be approximately matched by the resonant scanner aperture, eliminating a requirement for such optics.

Figure 5:
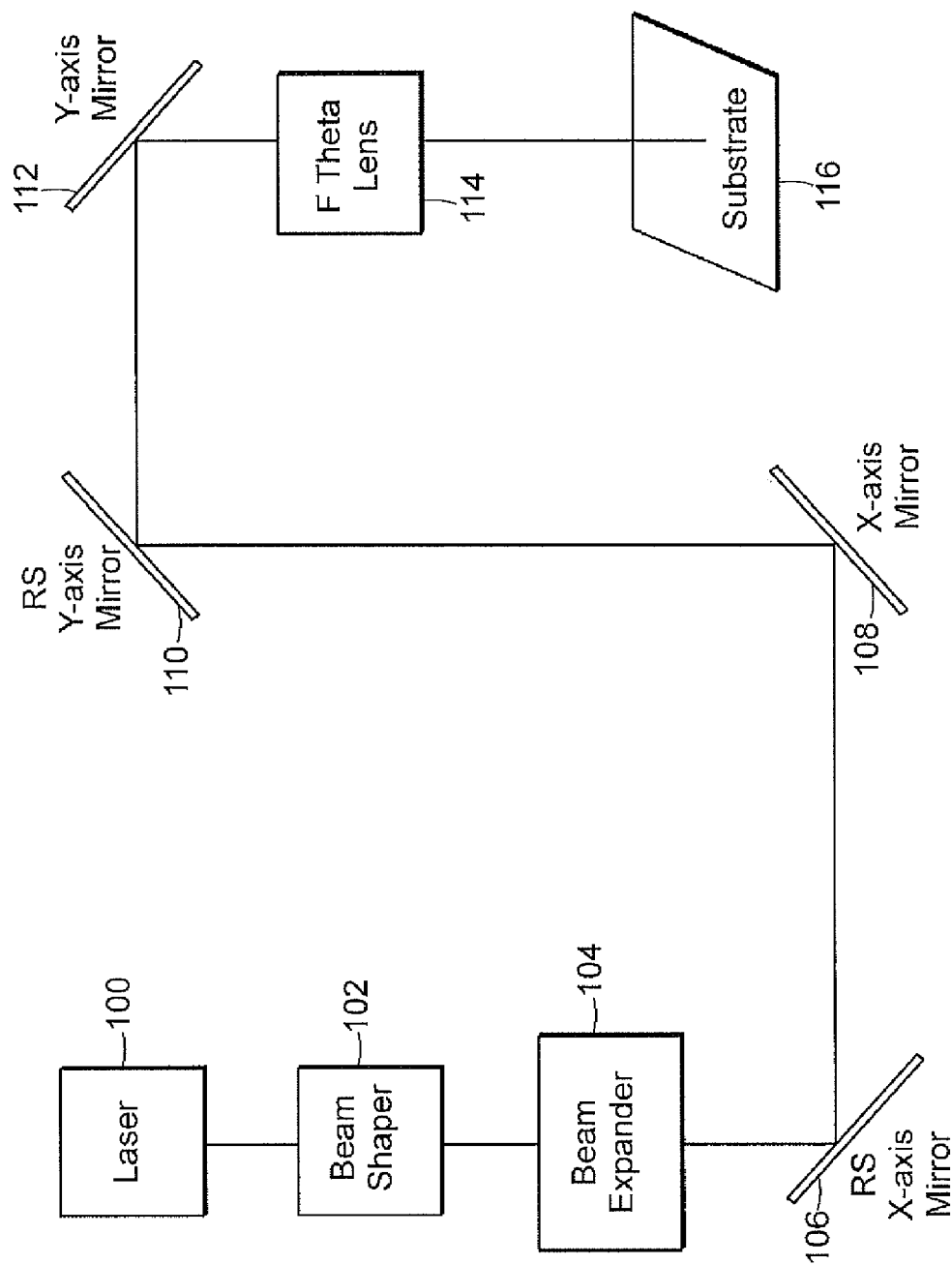
FIG. 5 shows an illustrative diagrammatic view of a laser processing system in accordance with a further embodiment of the invention.
Figure 6:
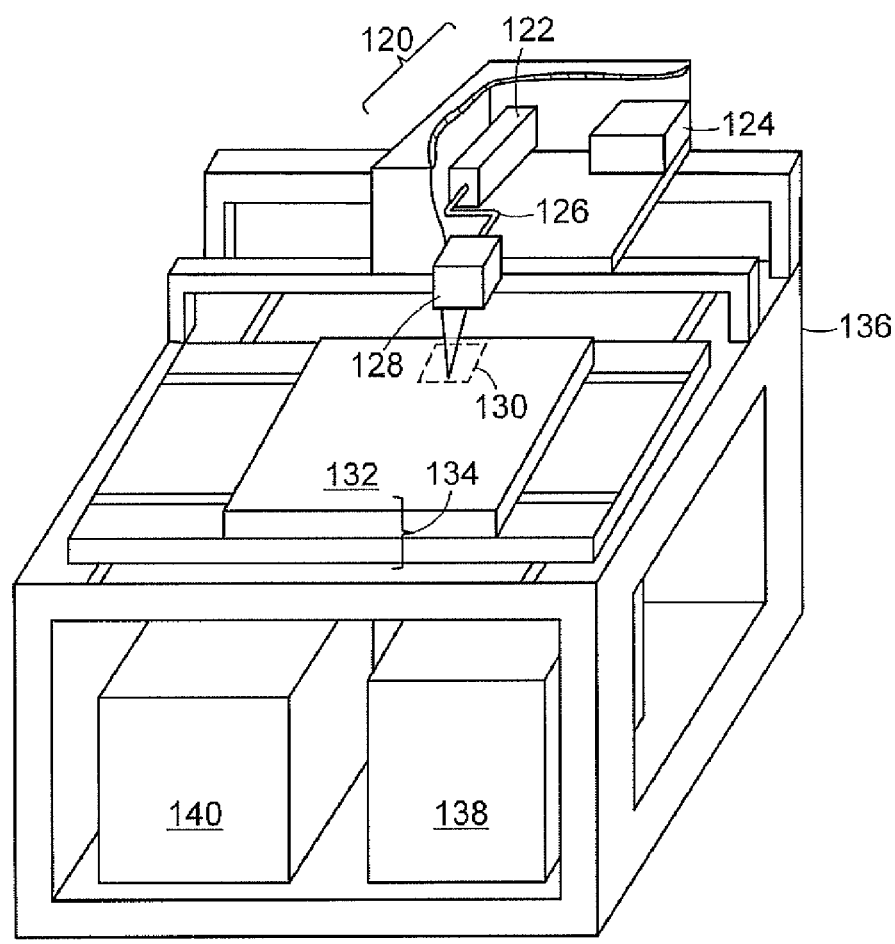
FIG. 6 shows an illustrative diagrammatic view of an X-Y high speed drilling system in accordance with an embodiment of the invention.

In further embodiments, a first resonant scanner and an optional second resonant scanner may be positioned after the beam expander as shown in FIG. 5. The system of FIG. 5 includes a laser 100, a beam shaper 102 and a beam expander 104 as discussed above. The system also includes an X-axis resonant scanner mirror 106, an X-axis mirror 108, a Y-axis resonant scanner mirror 110, and a Y-axis mirror 112, as well as an ftheta lens 114 for processing a substrate 116. Such a system may be well suited for applications in which the shape of the beam as output by the beam expander does not put undue range constraints on the resonant scanners 106 and 108.

The above embodiments and examples are particularly suited for drilling holes using a $CO_2$ laser such as for example, a Diamond series laser sold by Coherent, Inc. of Santa Clara, Calif. Typical hole size produced with $CO_2$ lasers are about 50 μm.

Other fast scanners may be used in some embodiments, alone or in combination with resonant scanners. The scanners may include acousto-optic devices, electro-optic devices, polygons, or holographic scanners. The suitability may depend on several parameters. For example, holographic scanners, may provide multiple functions in a single scanner, may be used at near IR or short visible wavelengths where diffraction efficiency is sufficiently high.

A laser drilling system in accordance with the invention, therefore, may include an optics box 120 that includes a laser 122 and a head controller 124. An optics and scan head unit 128 is also attached to the optics box 120. Laser illumination 126 is provided from the laser 122 to the scan head 128, and the unit 128 provides the beam expander, X and/or Y resonant scanners, X and Y mirrors, and f theta lens as discussed above. The laser focal area from the unit 128 is provided to a tile region 130 of a printed circuit board 132 that is provided as part of a tiling stage 134. The tiling stage 134 and optics box 120 are provided on a frame 136, and system control and power conditioning electronics 138, 140 are provide within the frame 136.

The laser drilling system of FIG. 5 provides that higher throughput may be achieved by employing one or two resonant scanners in addition to the X and Y scanners in the optics and scan head unit 128.

The principles of the present invention may also be extended to the microscopic scale. For example, performance improvement may be found in drilling holes in semiconductor substrates, wafers, photonic circuits and the like. Multiple pulses may be generated from a short wavelength laser, such as a green ultrashort laser. In certain cases, the high speed scanning mechanism and beam expander may be scaled to match the aperture of a high speed scanning microscope.

Those skilled in the art will appreciate that numerous modifications and variations may be made to the above disclosed embodiments without departing from the spirit and scope of the invention.

What is claimed is:

1. A laser processing system for providing a relatively small velocity of a laser beam at a target location while at least one scanner scans at a relatively larger velocity, said system comprising:
    a laser source for providing a pulsed laser output, the laser output having at least one beam with a beam dimension;
    a first scanning unit for scanning said laser output in reciprocating mutually opposed first and second directions at a substrate surface that includes the target location;
    a beam expander for receiving the laser output and for modifying a beam diameter of the laser output and providing a modified laser output along a modified laser output path;
    a second scanning unit for scanning said laser output in the second direction at the substrate surface that includes the target location, said first scanning unit having a relatively high operating frequency with respect to said second scanning unit such that a net velocity of movement of the modified laser output path in the second direction varies during each cycle of the second scanning unit from a positive velocity with respect to the second direction and a negative velocity with respect to the second direction and includes a zero crossing, and wherein the net velocity of the movement of the modified laser output path at the target location during the zero crossing may be made to be effectively reduced to a relatively small velocity during a laser pulse;
    a third scanning unit for scanning the modified laser output from the beam expander in a third direction at the substrate surface that includes the target location, said third direction being substantially orthogonal to said second direction;
    a controller for controlling said second scanning unit and said laser source responsive to a feedback signal from the first scanning unit; and
    focusing optics for focusing the modified laser output toward the target location.

2. The laser processing system as claimed in claim 1, wherein said net velocity of the modified laser output during the zero crossing is zero mm/sec.

3. The laser processing system as claimed in claim 1, wherein said modified laser output is employed for drilling at the target location.

4. The laser processing system as claimed in claim 1, wherein said first scanning unit includes a resonant scanner.

5. The laser processing system as claimed in claim 4, wherein said system further includes a resonant position estimator that determines an angular position of the resonant scanner that will provide the net velocity of the modified laser output at the target location that is effectively zero.

6. The laser processing system as claimed in claim 5, wherein said system further includes a fourth scanning unit for scanning the laser output in a fourth direction that is substantially opposite to the third direction at the substrate surface.

7. The laser processing system as claimed in claim 1, wherein said first scanning unit includes at least one of an acousto-optic modulator, an electro-optic modulator, and a linear controlled limited rotation scanner.

8. A laser processing system for providing a relatively small velocity of a laser beam at a target location while at least one scanner scans at a relatively larger velocity, said system comprising:

a laser source for providing a pulsed laser output, the laser output having at least one beam with a first beam diameter;

a first resonant scanning unit for scanning said laser output in reciprocating mutually opposed first and second directions at a substrate surface that includes the target location;

a beam expander for receiving the laser output from the first scanning unit and for modifying the laser output to have a second beam diameter;

a second scanning unit for scanning said laser output along a modified laser output path in the second direction at the substrate surface that includes the target location, said first resonant scanning unit having an operating frequency that is higher than the operating frequency of the second scanning unit such that a net velocity of movement of the modified laser output path in the second direction varies during each period of scanning movement of the first scanning unit between substantial non-zero velocities with respect to the second direction and effectively zero velocity at the target location;

a third scanning unit for scanning the laser output in a third direction at the substrate surface that is substantially orthogonal to the second direction; and a rotation detector that provides to a controller a high frequency feedback signal representative of a frequency of the first resonant scanning unit such that laser processing of the substrate surface is responsive to the high frequency feedback signal to provide that the net velocity of the movement of the modified laser output path varies non-linearly and at the first frequency, yet to also provide that laser processing is not done when the net velocity of the movement of the modified laser output path in the second direction is substantially non-zero.

9. The laser processing system as claimed in claim 8, wherein said system further includes a fourth scanning unit for scanning the laser output in a fourth direction at the substrate surface that includes the target location, said fourth direction being substantially opposite to the third direction at the substrate surface such that a net velocity of the movement of the modified laser output path along the third direction may be selectively made to be effectively zero during a laser pulse.

10. The laser processing system as claimed in claim 8, wherein said net velocity is zero mm/sec in both the second and third directions.

11. The laser processing system as claimed in claim 8, wherein said laser beam is employed for drilling at the target location.

12. The laser processing system as claimed in claim 8, wherein said high frequency feedback signal provides a system clock signal for the laser processing system.

13. A method of processing a target with a laser, said method comprising the steps of:

providing a laser output having at least one beam with a beam dimension;

scanning the laser output with a first scanning unit in reciprocating mutually opposed first and second directions at a substrate surface that includes a target location;

modifying the laser output to provide a modified laser beam having a modified beam dimension;

scanning the laser output with a second scanning unit in the second direction at the substrate surface that includes the target location, said first scanning unit having a relatively high frequency with respect to the second scanning unit such that a net velocity of the modified laser beam in the second direction varies during each cycle of the first scanning unit between substantially non-zero velocities with respect to the second direction and effectively zero velocity at the target location;

scanning the laser output with a third scanning unit along a modified laser output path in a third direction at the substrate surface that includes the target location, said third direction being substantially orthogonal to the second direction at the substrate surface;

providing a high frequency feedback signal representative of a frequency of the first scanning unit, wherein control of the second scanning unit is responsive to the high frequency feedback signal; and pulsing the laser output responsive to the high frequency feedback signal while scanning the laser output with the first and second scanning units such that a net velocity of movement of the modified laser output path in the second direction is effectively zero during a laser pulse to ensure that laser processing is not done when the net velocity of the movement of the modified laser output path in the second direction is substantially non-zero.

14. The method as claimed in claim 13, wherein said method further includes the step of scanning the laser output with a fourth scanning unit in a fourth direction at the substrate surface, said fourth direction being substantially aligned with and selectively opposite to the third direction at the substrate surface such that the net velocity of the movement of the modified laser output path along the second axis at the target location is selectively made to be effectively zero during the laser pulse.

15. The method of processing a target with a laser as claimed in clam 13, wherein the third scanning unit is not moving during the step of pulsing the laser output while scanning the laser output with the first and second scanners.

16. The method of processing a target with a laser as claimed in clam 13, wherein said step of scanning the laser output with the first scanning unit in the reciprocating mutually opposed first and second directions at the target location involves driving a resonant scanner at a scan repetition rate.

17. The method of processing a target with a laser as claimed in clam 16, wherein said method further includes the step of estimating responsive to the scan repetition rate, an angular position of the first scanning unit at which the net velocity of the movement of the modified laser output path is effectively reduced to a relatively small velocity.

18. The method of processing a target with a laser as claimed in clam 17, wherein said step of pulsing the laser output while scanning the laser output with the first and second scanning units is further responsive to the estimated angular position of the first scanning unit at which the net velocity of the movement of the modified laser output path at the substrate surface is effectively reduced to a relatively small velocity.

19. The method of processing a target with a laser as claimed in clam 16, wherein said feedback signal provides a laser processing system clock signal.

20. A method of processing a target with a laser, said method comprising the steps of:

providing a laser output having at least one beam with a beam dimension;

scanning the laser output with a first resonant scanning unit at a first frequency in reciprocating mutually opposed first and second directions at a substrate surface that includes a target location;

receiving a feedback signal from the first resonant scanner;

modifying the laser output to provide a modified laser beam having a modified beam dimension;

scanning the laser output at a second frequency responsive to the feedback signal with a second scanning unit along a modified laser output path in the second direction at the substrate surface that includes the target location, said second frequency being lower than said first frequency;

said step of scanning the laser output with the first resonant scanning unit causing a net velocity of movement of the modified laser output path to vary non-linearly during each period of scanning movement of the first resonant scanning unit from a positive velocity with respect to the second direction and a negative velocity with respect to the second direction such that the net velocity includes a zero crossing; and pulsing the laser output while scanning the laser output with the first resonant scanning unit and the second scanning unit when the net velocity of the movement of the modified laser output path is at the zero crossing such that the net velocity of the movement of the modified laser output path along the second direction is effectively zero during a laser pulse such that a generally circular-shaped hole is formed at the target location.

21. The method as claimed in claim 20, wherein said method further includes the step of determining an angular position of the first resonant scanning unit that will provide the net velocity of the movement of the modified laser output path along the first axis at the target location that is effectively zero.

22. The method as claimed in claim 20, wherein said method includes the step of processing a plurality of target locations, each of which is processed by pulsing the laser output while scanning the laser output with the first resonant scanning unit and the second scanning unit such that the net velocity of the movement of the modified laser output path along the first axis is effectively zero during each laser pulse, and the first resonant scanning unit undergoes a plurality of cycles within a single cycle of the second scanning unit.

23. The method as claimed in claim 20, wherein said method includes the step of processing a plurality of target locations that are separated from one another by a distance that is equal to an integer multiple of a pitch corresponding to the first frequency of the first resonant scanning unit.

24. A method of processing a plurality of target locations with a laser, said method comprising the steps of:

providing a laser output having at least one beam with a beam dimension;

scanning the laser output with a first scanning unit at a first frequency in reciprocating mutually opposed first and second directions at a substrate surface that includes the plurality of target locations;

receiving a feedback signal from the first resonant scanner;

scanning the laser output at a second frequency responsive to the feedback signal with a second scanning unit in the second direction at the substrate surface that includes the target location, said first frequency being higher than the second frequency, and said plurality of target locations being separated from one another by a distance that is equal to an integer multiple of a pitch corresponding to a resonant frequency of the first resonant scanning unit;

scanning the laser output with a third scanning unit in a third direction along a modified laser output path at the substrate surface, wherein said third direction is substantially orthogonal to the second direction; and pulsing the laser output responsive to the feedback signal while scanning the laser output with the first and second scanners such that a net velocity of movement of the modified laser output path along both the first axis and the second axis is effectively zero during a laser pulse at each of the plurality of target locations and such that the velocity of the movement of the modified laser output path during each period scanning movement of the second scanning unit is non-linear and varies at the first frequency.

25. The method as claimed in claim 24, wherein said method further includes the step of determining an angular position of the first scanning unit that will provide the net velocity of the movement of the modified laser output path at each of the plurality of target locations that is effectively zero.

26. The method as claimed in claim 24, wherein each of said plurality of target locations is a hole to be drilled in a circular shape while at least the first resonant scanning unit and the second scanning unit are both moving.

27. The method as claimed in claim 26, wherein said method further includes the step of drilling a generally circular-shaped hole at each of the plurality of target locations.

* * * * *